United States Patent [19]
Kreuter

[11] Patent Number: 5,669,266
[45] Date of Patent: Sep. 23, 1997

[54] COUPLING GEAR

[75] Inventor: Peter Kreuter, Aachen, Germany

[73] Assignee: Meta Motoren- und Energie-Technik GmbH, Herzogenrath, Germany

[21] Appl. No.: 598,512

[22] Filed: Feb. 8, 1996

[30] Foreign Application Priority Data

Feb. 8, 1995 [DE] Germany ............... 195 04 132.1
Jun. 8, 1995 [DE] Germany ............... 195 21 004.2

[51] Int. Cl.$^6$ ................... F01L 1/34; F16H 53/04
[52] U.S. Cl. ............... 74/395; 74/568 R; 123/90.15
[58] Field of Search ............... 74/395, 568 R; 123/90.15, 90.17

[56] References Cited

U.S. PATENT DOCUMENTS

| | | | |
|---|---|---|---|
| 1,622,491 | 3/1927 | Coatalen | 123/90.15 X |
| 1,622,492 | 3/1927 | Coatalen | 123/90.15 X |
| 2,279,413 | 4/1942 | Read | 123/90.15 X |
| 4,942,777 | 7/1990 | Fife | 74/395 X |

FOREIGN PATENT DOCUMENTS

4244550 7/1994 Germany .
147234 8/1931 Switzerland ............... 123/90.15

*Primary Examiner*—Allan D. Herrmann
*Attorney, Agent, or Firm*—Robert W. Becker & Associates

[57] ABSTRACT

A coupling gear for transmitting rotation of a first shaft onto a second shaft has a first coupling wheel fixedly connected to the first shaft and a second coupling wheel fixedly connected to the second shaft. A third coupling wheel is driven by the first coupling wheel and a fourth coupling wheel is driven by the third coupling wheel and drives the second coupling wheel. A first coupler couples the rotational axle of the first coupling wheel and the rotational axle of the third coupling wheel. A second coupler couples the rotational axle of the third coupling wheel and the rotational axle of the fourth coupling wheel. A third coupler couples the rotational axle of the fourth coupling wheel and the rotational axle of the second coupling wheel. A control device for adjusting with a control movement the rotational phase of the first and second shafts has a control element for adjusting the angle between the first, second, and third couplers. The control device also has a friction member movable into frictional engagement with at least one of the coupling wheels to thereby aid the control movement initiated by the control device.

22 Claims, 5 Drawing Sheets

COUPLING GEAR

BACKGROUND OF THE INVENTION

The present invention relates to a coupling gear for transmitting the rotation of a shaft onto another shaft, wherein a first coupling wheel is fixedly connected to one shaft and a second coupling wheel is fixedly connected to the other shaft. A third coupling wheel, driven by the first coupling wheel, and a fourth coupling wheel, driven by the third coupling wheel and driving the second coupling wheel, are provided. The rotational axes of the first and third coupling wheels, of the third and fourth coupling wheels, and of the fourth and second coupling wheels are connected with one another via couplers and the phase of rotation of one shaft relative to the other shaft can be adjusted with a control device which comprises a control element for adjusting the angle between the couplers.

Such coupling gears are to be used for various applications and are, for example, known from German Patent Application P 42 44 550.7-13. One application for such coupling gears are devices for variably controlling the valves of combustion engines, especially for throttle-free load control of spark ignition engines via the inlet lift function of one or more inlet valves per cylinder, whereby the inlet lift function by two cam shafts the phase position of which can be adjusted. One requirement, which can only be dissatisfactorily fulfilled with conventional coupling gears in the designated application, is that the phase of the cam shafts must be adjusted by a great value within a short period of time.

It is therefore an object of the present invention to provide a coupling gear of the aforementioned kind with which great phase changes within a short period of time can be effected.

SUMMARY OF THE INVENTION

The inventive coupling gear for transmitting rotation of a first shaft onto a second shaft according to the present invention is primarily characterized by:

A first and a second shaft;

A first coupling wheel fixedly connected to the first shaft;

A second coupling wheel fixedly connected to the second shaft;

A third coupling wheel with a rotational axle driven by the first coupling wheel;

A fourth coupling wheel with a rotational axle driven by the third coupling wheel and driving the second coupling wheel;

A first coupler for coupling the rotational axle of the first coupling wheel and the rotational axle of the third coupling wheel;

A second coupler for coupling the rotational axle of the third coupling wheel and the rotational axle of the fourth coupling wheel;

A third coupler for coupling the rotational axle of the fourth coupling wheel and the rotational axle of the second coupling wheel;

A control device for adjusting with a control movement a rotational phase of the first shaft relative to the second shaft, the control device comprising a control element for adjusting the angle between the first, second, and third couplers;

The control device further comprising a friction member movable into frictional engagement with at least one of the coupling wheels to thereby aid the control movement initiated by the control device.

Advantageously, the coupling wheels are gear wheels and the friction member is movable alternatingly into frictional engagement with one of two of the gear wheels that rotate in opposite directions.

Preferably, the coupling gear further comprises a solenoid for moving the friction member into frictional engagement.

Expediently, the coupling gear further comprises a control member and a helical gearing. The friction member is preferably an axially displaceable transmission gear wheel and the control motor is drivingly connected with a helical gearing to the transmission gear wheel. The transmission gear wheel has lateral surfaces with friction surfaces and the two gear wheels that rotate in opposite directions have lateral surfaces with friction surfaces. The frictional surfaces of the transmission gear wheel and the frictional surfaces of the two gear wheels provide the frictional engagement.

Advantageously, the transmission gear wheel is movable into frictional engagement with one of the two gear wheels that rotate in opposite directions.

Preferably, the control device further comprises a control gear wheel with an eccentric. The control element is supported at the eccentric.

Advantageously, the rotational axis of the control gear wheel is positioned so as to coincide with the rotational axle of one of the first and second coupling wheels and the control element engages one of the rotational axles of the third and fourth coupling wheels.

Preferably, the helical gearing comprises a drive pinion connected to the control motor and an outer toothing connected to the transmission gear wheel. The drive pinion meshes with the outer toothing of the transmission gear wheel. The control gear wheel is shaped as a segment of a circle and has an outer toothing. The transmission gear wheel comprises a further toothing meshing with the outer toothing of the control gear wheel. The gear ratio between the drive pinion and the outer toothing of the control gear wheel is such that a large rotational angle of the drive pinion results in a small rotational angle of the control gear wheel.

Preferably, the coupling gear has a self-locking action with respect to accidental adjustment when the control device is not activated.

Preferably, the self-locking action is realized with the eccentric acting on the control element.

In a preferred embodiment of the present invention, the eccentric is comprised of a pin eccentrically connected to the control gear wheel and a bearing sleeve supported on the pin. The control element is connected to the bearing sleeve and the diameter of the bearing sleeve is greater than the distance between the axis of the bearing sleeve and the rotational axle of the control gear wheel.

Preferably, in one end position of the eccentric the rotational phase assumes an extreme value.

Expediently, the friction member is elastically biased into a neutral position.

In a preferred embodiment of the present invention the friction member is mounted on one of the couplers.

In yet another embodiment of the present invention the coupling gear further comprises a device for resetting the rotational phase to a preset value when an operating error occurs.

In another embodiment of the present invention the control device comprises a drive unit with a drive gear wheel rotatable in opposite directions. Advantageously, the control device further comprises a control member with an outer toothing and the drive gear wheel meshes with the control member. The drive unit is positioned eccentrically to the rotational axis of the drive gear wheel and has a pivot axis about which the drive unit is pivotable. The friction member is preferably a friction wheel. The drive unit, when the drive gear wheel is being driven, is pivoted due to a reaction force resulting at the control member about the pivot axis such that the friction wheel is brought into frictional engagement with one of two of the coupling wheels rotating in opposite directions for aiding rotation of the drive gear wheel.

Preferably, the pivot axis is arranged symmetrically to the rotational axes of the two coupling wheels rotating in opposite directions.

Advantageously, the control member is a control gear wheel having a rotational axis positioned so as to coincide with the pivot axis.

In a preferred embodiment of the present invention, the friction wheel has a friction surface and the coupling wheels have a friction surface for providing the frictional engagement. The friction surfaces of the friction wheel and of the coupling wheels have a plurality of wedge projections.

Preferably, the drive gear wheel is positioned such that a rotational axis of the drive gear wheel and a rotational axis of the friction wheel coincide. The drive gear wheel is preferably fixedly connected to the friction wheel. The friction wheel has an outer circumferential surface that is a friction surface.

Advantageously, the drive unit comprises an electric motor with a drive pinion. The friction wheel has an inner toothing and planetary gear wheels meshing with the inner toothing. The drive pinion drives the planetary gear wheels.

In another embodiment, the drive unit comprises an electric motor comprising a worm gear for driving the drive gear wheel.

With the inventively provided friction member it is achieved that only minimal requirements must be placed onto the control device for fast adjustment of the phase position. The required exterior force for the control device is thus reduced. The movement transmitted from the control device onto the control element is aided by engagement of the friction member with at least one moving part of the coupling gear by using in the manner of a servo device the kinetic energy contained within the moving part, triggered by the control device, for adjusting the control element. Coupling gear systems that can be used in connection with the present invention can have various designs; their gear wheels can be in direct engagement; between the gear wheels pulling means such as belts, cardan drives etc. can be used.

The engagement of the friction member with advantageously at least one of the gear wheels can be embodied in various manners. For example, the friction member can be pressed onto the corresponding friction surface of the gear wheel in the axial or radial direction. The control device can be actuated directly manually, pneumatically, hydraulically or electromotorically.

The inventive coupling gear is suitable for various applications. It can be used advantageously where, despite a limited energy, respectively, power supply of the control device, a secure and fast adjustment of the relative phase position of two shafts operating at the same rpm is to be performed.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 8.

Figure 1:
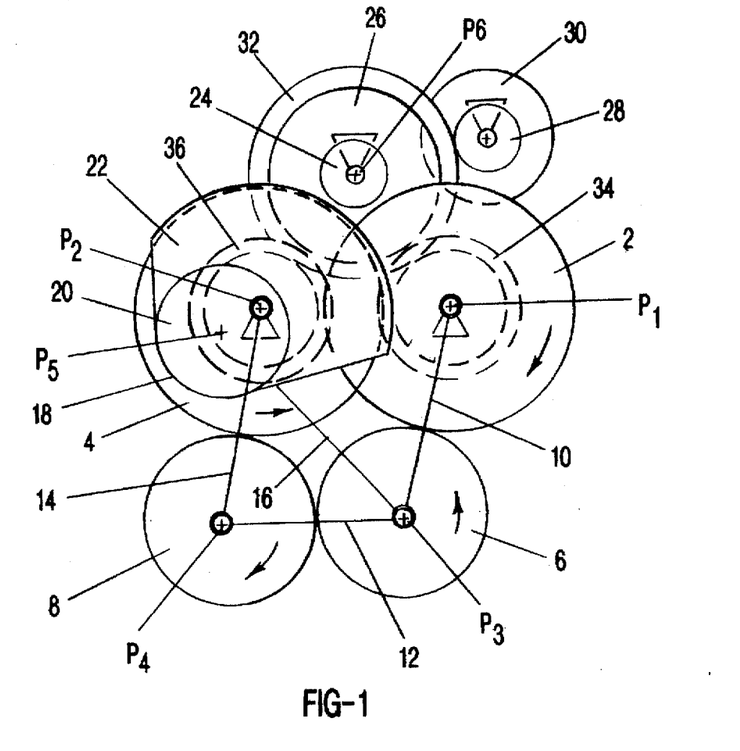
FIG. 1 shows an end view of a coupling gear.
Figure 2:
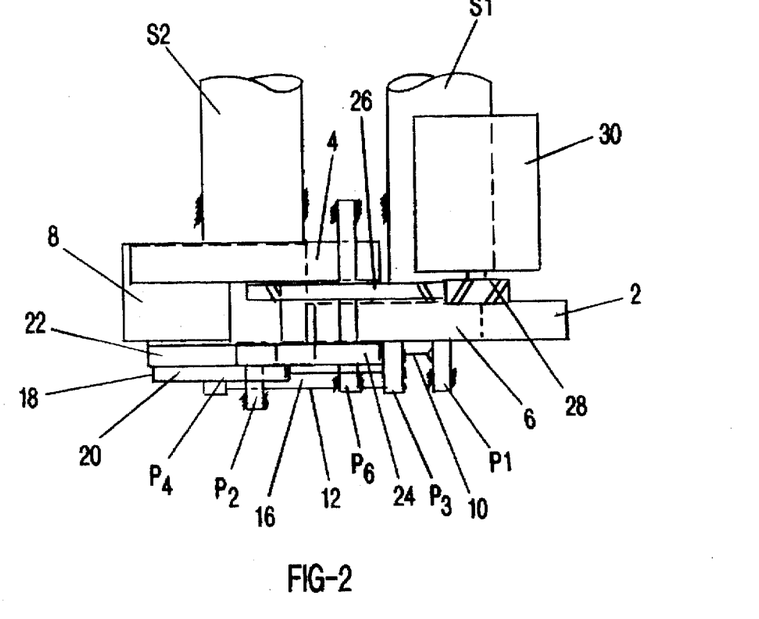
FIG. 2 shows a top view of the coupling gear of FIG. 1.

A first gear wheel 2 is fixedly connected to a first cam shaft S1 that is stationarily supported, respectively, supported at a motor block with its axle P1. A second gear wheel 4 is fixedly connected to a further, cam shaft S2 of a motor with its axle P2. The two gear wheels 2 and 4, as can be seen in FIG. 2, are axially staggered relative to one another so that their peripheries overlap. A third gear wheel 6 meshes with the first gear wheel 2 which, in turn, meshes with a fourth gear wheel 8 which then also meshes with the second gear wheel 4. The gear wheels 6 and 8 are supported on couplers, whereby a first coupler 10 is supported at P1 and the third gear wheel 6 as well as the second coupler 12 are supported at P3. The second coupler is connected jointedly at P4 with a third coupler 14 which is supported at P2. At P4 the fourth gear wheel 8 is supported. The number of teeth of the gear wheels 6 and 8 is preferably different. However, the first gear wheel 2 and the second gear wheel 4, when both have the same number of teeth, respectively, the same diameter, rotate at the same rpm in opposite rotational directions whereby the phase position between the rotation of the gear wheels 2 and 4, in a manner known per se, is adjustable by changing the angular position of the couplers 10, 12, 14.

For changing the angular position of the couplers a control element in the form of a connecting coupler 16 is provided. The connecting coupler 16 is supported at P3 and terminates in a bearing sleeve 18 that is supported on a pin 20. The pin 20 is positioned eccentrically on the control gear wheel 22 which is supported at P2. The axis of the bearing 18, 20, which is positioned eccentrically to P2, is indicated with reference numeral P5.

An outer toothing of the segment-shaped control gear wheel 22 meshes with a pinion 24 which is a unitary part of the transmission gear wheel 26. The pinion 24 is rotatable about a stationary axle P6 and is axially displaceable. An outer toothing of the transmission gear wheel 26 meshes with a drive pinion 28 of an electric motor 30. The toothing between the drive pinion 28 and the transmission gear wheel 26 is in the form of a helical gearing so that upon torque transmission from the drive pinion 28 onto the transmission gear wheel 26, depending on the drive direction, an axial displacement of the transmission gear wheel 26 in one or the other direction takes place.

As indicated in FIG. 2, the transmission gear wheel 26 is arranged between the gear wheels 2 and 4. The transmission gear wheel 26 is provided at its end faces with friction surfaces 32 which overlap with friction surfaces 34, 36 respectively provided at the gear wheel 2 and 4. The friction surfaces such as annular friction surfaces can, for example, be embodied such that each of the aforementioned end faces of the gear wheels is provided with an annular projection and the friction surfaces are formed by the end faces of the projections.

For the following description of the function of the device, it is presupposed that the first gear wheel 2 according to FIG. 1 rotates in clockwise direction so that the second gear wheel 4 is driven via the third gear wheel 6 and the fourth gear wheel 8 with the same rotational speed but in the opposite direction. With the pin 20 having a correspondingly great diameter in relation to its eccentricity, the engagement between the connecting coupler 16, respectively, the bearing sleeve 18 with the pin 20 provides for a self-locking action of the coupling gear so that the coupling gear, due to the torque transmission from the first gear wheel 2 onto the second gear wheel 4 (or vice versa), cannot be automatically (accidentally) adjusted.

When the drive pinion 28 for adjusting the coupling gear is driven in the clockwise direction, so that the transmission gear wheel 26 is rotated counter clockwise to thereby rotate the control gear wheel 22 in clockwise direction, the pin 20 together with the connecting coupler 16 are moved to the left and the coupling gear, respectively, the phase between the rotation of the two gear wheels 2 and 4 is adjusted correspondingly. Upon torque transmission from the drive pinion 28 onto the transmission gear wheel 26, the latter is forced, due to the helical gearing, in the direction toward the first toothed wheel 2 so that the frictional engagement between the friction surfaces 32 and 34 provides for an additional drive of the transmission gear wheel 26 in counterclockwise direction, i.e. the adjustment (control movement) is facilitated. As soon as the torque from the drive pinion 28 is relieved, no further pressing of the friction surfaces 32 and 34 takes place because due to the self-locking action of the coupling gear no torque is transmitted from the transmission gear wheel 26 onto the drive pinion 28. When the drive pinion 28 is rotated in the opposite direction, the transmission gear wheel 26 is forced with its corresponding friction surface against the friction surface 36 of the second gear wheel 4 so that the adjustment of the inventive coupling gear is again facilitated.

It is understood that the gear ratio between the drive pinion 28 and the control gear wheel 22 is advantageously selected such that a great change of angle at the drive pinion 28 results in a small change of angle at the control gear wheel 22. The electric motor 30 is advantageously designed such that it starts up with relatively great torque, i.e., upon actuation it reacts immediately. The further torque requirement must no longer be that great due to the servo action provided.

The correlation between position of the eccentric drive 18, 20 and phase position of the gear wheels 2 and 4, for example, in the application for a cam drive, is advantageously such that at least one of the end positions corresponds to an extreme value, i.e., the minimum, respectively, maximum phase position. When the cam drive provided with the coupling gear serves, for example, for load control of an internal combustion engine without throttle, the maximum charge filling and thus also the maximum output can be safely limited in this manner.

It is understood that a plurality of modifications and/or additional features of the present device are possible. For example, the transmission gear wheel 26 can be biased with its pinion 24 in an elastic manner in a neutral (central) position so that it is ensured that without torque provided by the drive pinion 28 no frictional engagement between any of the friction surfaces is possible. Furthermore, instead of a helical gearing between the drive pinion 28 and the outer toothing of the transmission gear wheel 26 a spur toothed gearing can be used when, for example, the transmission gear wheel 26 is axially moved in one or the other direction by a double-action hydraulic cylinder or solenoid in conjunction with an electric motor 30 as a drive unit, which will be described in the following. The friction surfaces can also be in the form of radial surfaces, the transmission gear wheel 26 then must be moved radially relative to the friction surfaces.

The connecting coupler 16 for adjusting the coupling gear can also be directly linearly driven and connected to a friction member which upon displacement of the connecting coupler is forced into abutment of an end face of, for example, the second gear wheel 4 provided at a suitable location.

It is understood that the inventive coupling gear can also be embodied such that further wheels are meshing with the gear wheels which then provide for the frictional engagement. In a further embodiment it is also possible to design the self-locking action within the coupling gear such that the coupling gear, because of the torque transmission from the first gear wheel onto the gear wheel 4 driven by it, has the tendency to self-adjust in one direction so that this direction of adjustment must be released by a control means. A servo action by frictional engagement is thus necessary only in the other adjustment direction.

In the disclosed embodiment the control device, for the connecting coupler 16, comprised of the eccentric drive 18, 20, the control gear wheel 22, the transmission gear wheel 26, and the electric motor 30, is supported at a stationary bearing location, for example, directly at the internal combustion engine. When such a design variation is impossible due to spatial limitations, the control device can also be mounted alternatively at one of the couplers, for example, the coupler 12 whereby the transmission gear wheel can then be supported at P3 or P4.

In another variation of the inventive design, the component to which the pin 20 is mounted is not embodied as a control gear wheel but as a lever which is supported at P2 and which is rotated by a drive unit, for example, a worm gear driven electromotorically.

Figure 3:
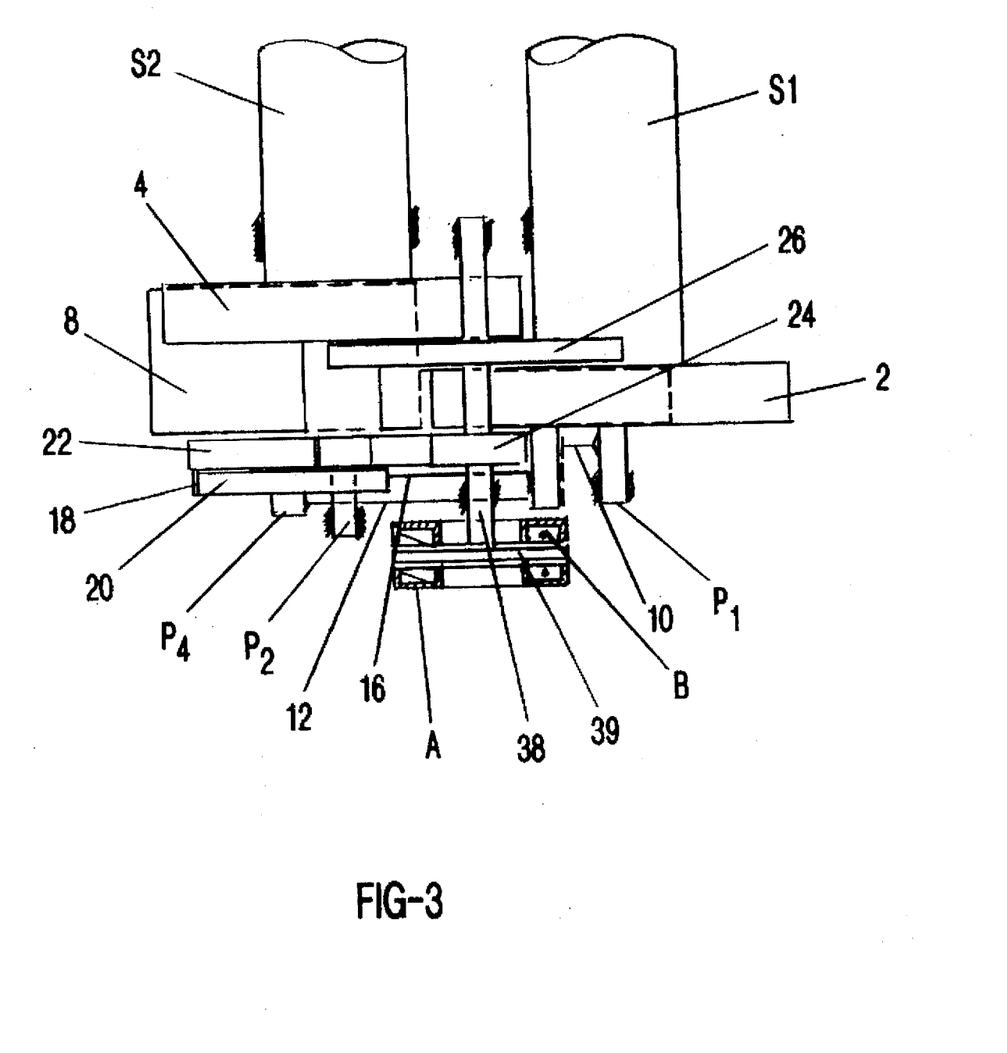
FIG. 3 shows a top view of an alternative embodiment of a coupling gear.

The embodiment of the coupling gear according to FIG. 3 differs from the one represented in FIG. 2 in that for the axial displacement of the transmission gear wheel 26 in order to realize frictional engagement with the gear wheels 2 or 4, an armature 39 cooperates with the shaft 38 of the transmission gear wheel. The armature 39 is moved by two solenoids A, B in one or the other direction to thereby entrain the transmission gear wheel in the axial direction. The adjustment of the coupling gear in this embodiment is performed exclusively by the frictional engagement of the transmission gear wheel 26 meshing with the control gear wheel 22.

The disclosed embodiment can be provided in a simple manner with a safety function by supplying a spring in addition to the magnetic drive. The spring engages the armature 39 and is neutralized by a further solenoid during normal operation. Upon detection of an error, for example, breakdown of the energy supply, it pulls the armature 39 in a direction in which the transmission gear wheel 26 engages one of the gear wheels 2 or 4 such that the coupling gear is displaced, for example, in the direction of reduced power output of an internal combustion engine.

Figure 4:
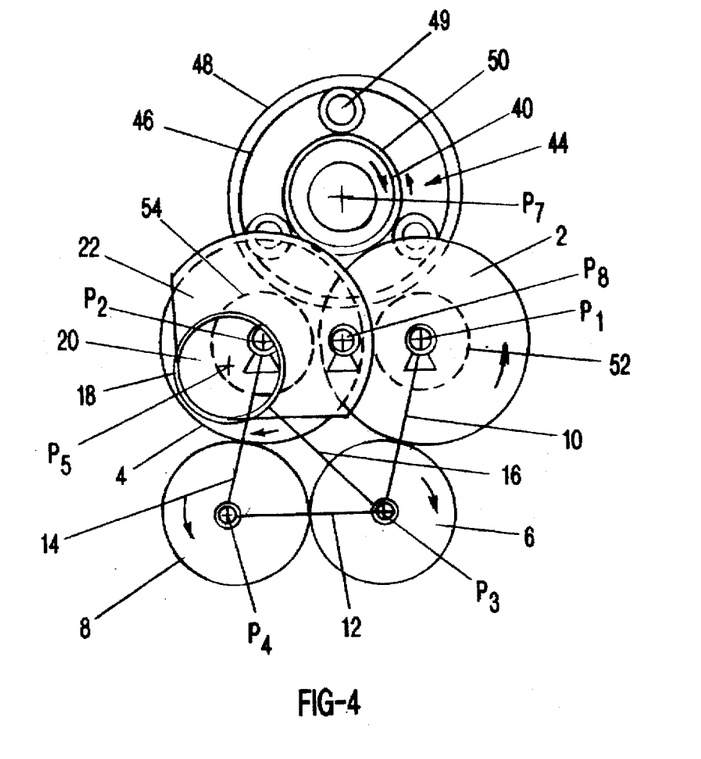
FIG. 4 shows an end view of a further embodiment of the coupling gear.
Figure 5:
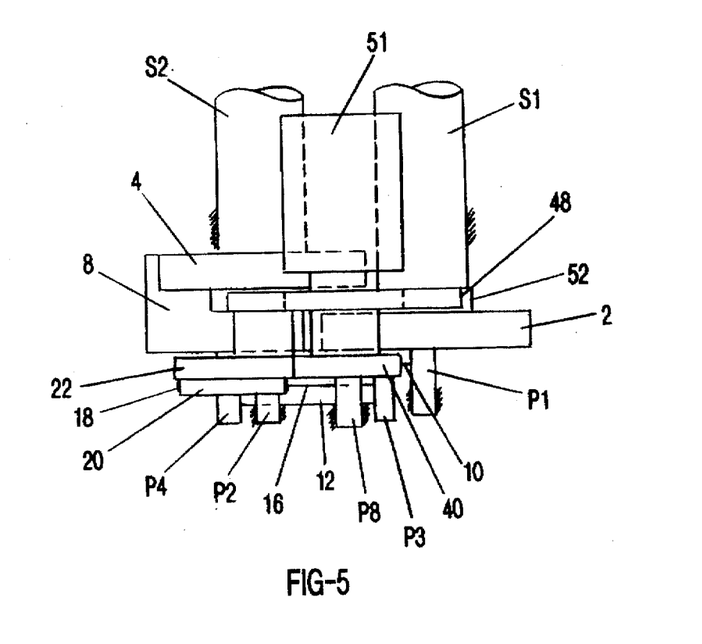
FIG. 5 shows a top view of the coupling gear of FIG. 4.

In the embodiment of the coupling gear according to FIGS. 4 and 5, a drive gear wheel 40 meshes with the toothing provided at the exterior of the segment-shaped control gear wheel 22. This drive gear wheel 40 comprises a friction wheel 44 being a unitary part thereof. The friction wheel 44 has an inner toothing 46, an exterior friction surface 48, and a rotational axis P7. The inner toothing 46 of the friction wheel 44 meshes with planet gear wheels 49 which mesh, in turn, with the toothing of the pinion 50 of electric motor 51 with which the drive gear wheel 40 is driven in both directions.

The components electric motor 51 with pinion 50, friction wheel 44, and planetary gear wheels 49 form a pre-mounted structural group that is supported and pivotable as a whole on the axle P8 which is fixedly connected to the motor.

The friction surface 48 of the friction wheel 44 in the rest position of the disclosed device is almost in engagement with, respectively, abutting the friction surfaces 52, 54 which are embodied at the circumferential surfaces of projections of the gear wheels 2 and 4 serving as coupling wheels.

The function of the disclosed device is as follows:

When the coupling wheels 2, 4, 6 and 8 are rotated in the direction of the arrows shown in the drawings, i.e., the coupling wheel 2 is rotated counter-clockwise and the coupling wheel 4 is rotated clockwise and when the drive gear wheel 40 is driven via the drive pinion 50 and the planetary gear wheels 49 and the friction wheel 44 in the clockwise direction, the control gear wheel 22 is rotated in the counter-clockwise direction. The reaction force between drive gear wheel 40 and control gear wheel 22 causes the entire structural group 44, 49, 51 and 50 to be pivoted to the right about the axle P8 so that the friction surface 48 of the friction wheel 44 comes increasingly into contact with the friction surface 52 of the coupling gear wheel 2 so that the rotation of the coupling gear wheel 2 aids in driving the friction wheel 44 and thus aids in adjusting the control gear wheel 22. As soon as the rotational drive of the pinion 40 of motor 51 ceases, the frictional engagement is released and the control member 22 remains in its position as a consequence of the self-locking action between the pin 20 and the bearing sleeve 18. Upon displacement in the opposite direction, the aforementioned components act in the other direction.

It is understood that numerous variations of the disclosed arrangement are possible. For example, the drive gear wheel could be directly driven by the electric motor so that the planetary gear wheels, which are advantageous with respect to the transmission action, are obsolete. The friction wheel can also be supported separate from the drive gear wheel.

Advantageously, the control gear wheel 22 can be positioned such that its axis coincides with the axle P8. The tooth engagement between control gear wheel 22 and pinion 40 is thus not changed in any manner when the structural group consisting of motor, planetary gear wheels, and friction wheel are pivoted about the axle P8. Since the pivot movement is however very small, a reliable tooth engagement is ensured also in this construction.

Figure 6:
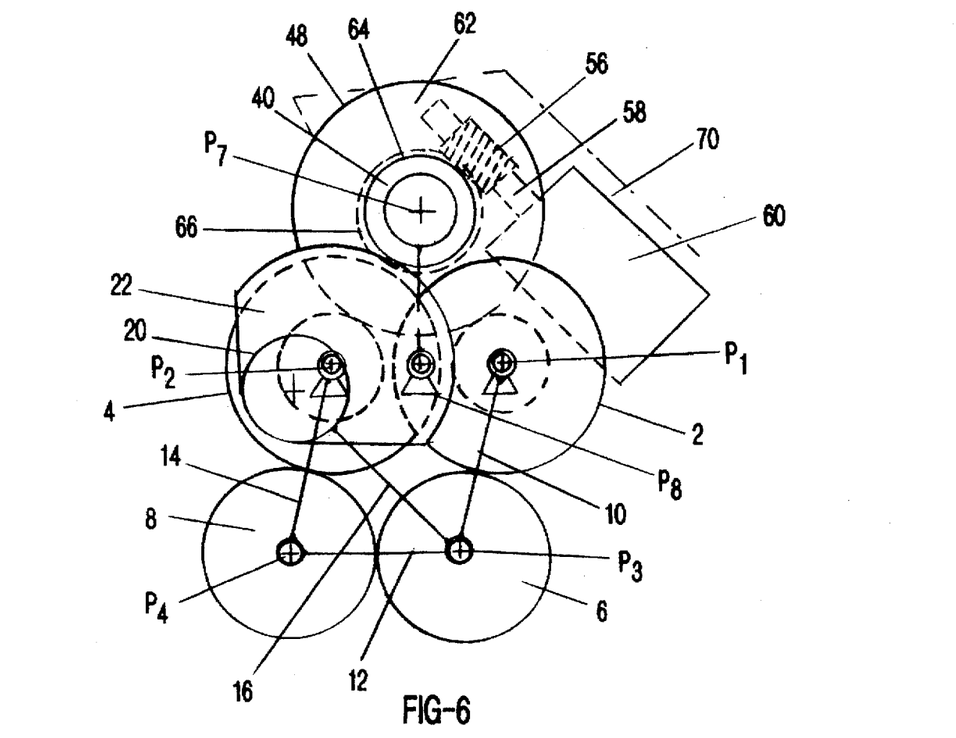
FIG. 6 shows an end view of another embodiment of a coupling gear.
Figure 7:
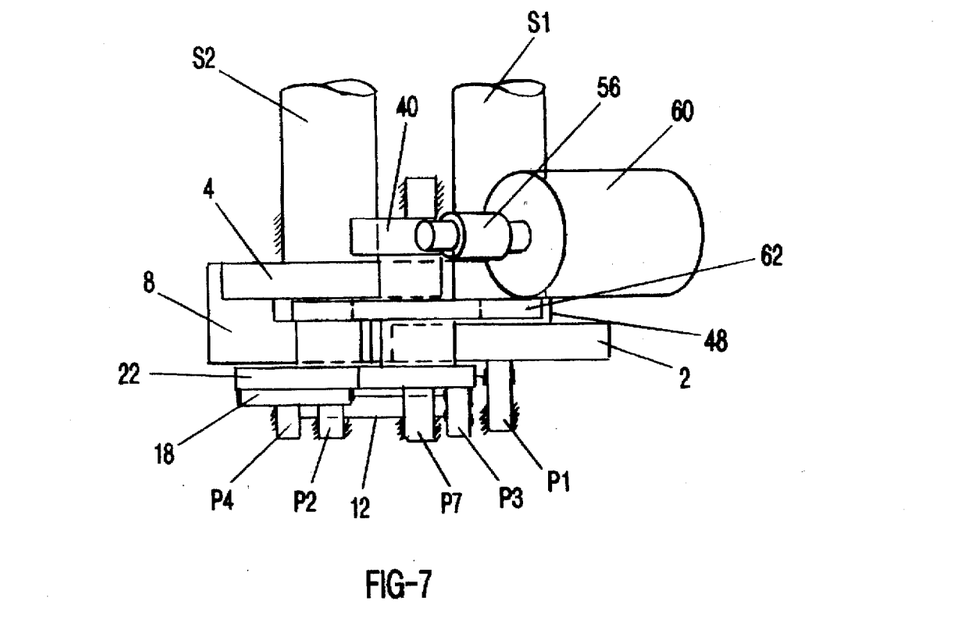
FIG. 7 shows a top view of the coupling gear of FIG. 6.

The embodiment represented in FIGS. 6 and 7 differs from the embodiment of FIGS. 4 and 5 only with respect to the drive of the drive gear wheel 40. With the exception of the drive gear wheel 40 only those reference numerals are shown which vary with respect to the embodiment of FIGS. 4 and 5. The outer toothing of the drive gear wheel 40 meshes with a worm gear 56 that is mounted to the drive shaft 58 of the electric motor 60. The friction wheel 62 which is fixedly connected to the drive gear wheel 40 in this embodiment does not have an inner toothing but is only provided with the friction surface 48 at its outer circumference. The drive gear wheel 40 has two toothings that are axially staggered. The toothing 64 meshes with the worm gear 56 and the other toothing 66 meshes with the control gear wheel 22 according to FIG. 4. The transmission of power between electric motor and drive gear wheel, which in the embodiment according to FIG. 4 takes place via the planetary gear wheels, is realized in this embodiment with the worm gear 56 of FIG. 6.

In FIG. 6 a common base plate 70 is indicated with dashed lines to which the drive gear wheel 40, the friction wheel 62, fixedly connected thereto and rotatable about their common rotational axis P7, as well as optionally the electric motor 60 with worm gear 56 are mounted such that the entire structural group can be pivoted about the pivot axle P8. The electric motor 60 could also be fastened to another component of the coupling gear so that it does not follow the small movement of the base plate.

Figure 8:
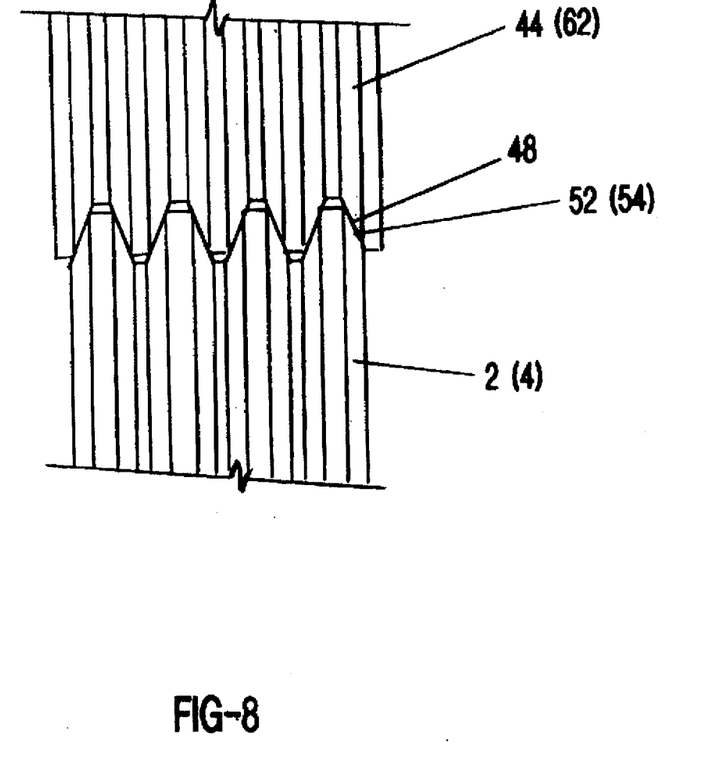
FIG. 8 shows an advantageous embodiment for the friction surfaces.

FIG. 8 shows another advantageous embodiment of the friction surfaces at the circumferential edge of the friction wheel 44, 62 and of the coupling gear wheels 2, 4 whereby the friction surfaces are shown in the circumferential direction, i.e., perpendicular to the rotational axis of the corresponding wheels. Due to the embodiment of the friction surfaces as surfaces with a plurality of wedge projections (greatly enlarged representation) a softer and at the same time considerably improved frictional engagement is provided.

The present invention is, of course, in no way restricted to the specific disclosure of the specification and drawings, but also encompasses any modifications within the scope of the appended claims.

What I claim is:

1. A coupling gear for transmitting rotation of a first shaft onto a second shaft, said coupling gear comprising:

a first and a second shaft;

a first coupling wheel fixedly connected to said first shaft;

a second coupling wheel fixedly connected to said second shaft;

a third coupling wheel with a rotational axle driven by said first coupling wheel;

a fourth coupling wheel with a rotational axle driven by said third coupling wheel and driving said second coupling wheel;

a first coupler for coupling the rotational axle of said first coupling wheel and said rotational axle of said third coupling wheel;

a second coupler for coupling said rotational axle of said third coupling wheel and said rotational axle of said fourth coupling wheel;

a third coupler for coupling said rotational axle of said fourth coupling wheel and the rotational axle of said second coupling wheel;

a control device for adjusting with a control movement a rotational phase of said first shaft relative to said second shaft, said control device comprising a control element for adjusting an angle between said first, second, and third couplers;

said control device further comprising a friction member moveable into frictional engagement with at least one of said coupling wheels to thereby aid the control movement initiated by said control device.

2. A coupling gear according to claim 1, wherein said coupling wheels are gear wheels and wherein said friction member is moveable alternatingly into frictional engagement with one of two of said gear wheels that rotate in opposite directions.

3. A coupling gear according to claim 2, further comprising a solenoid for moving said friction member into frictional engagement.

4. A coupling gear according to claim 2, further comprising a control motor and a helical gearing, wherein said friction member is an axially displaceable transmission gear wheel and wherein said control motor is drivingly connected with said helical gearing to said transmission gear wheel, wherein said transmission gear wheel has lateral surfaces with friction surfaces and said two gear wheels that rotate in opposite directions have lateral surfaces with friction surfaces, wherein said frictional surfaces of said transmission gear wheel and said frictional surfaces of said two gear wheels provide said frictional engagement.

5. A coupling gear according to claim 4, wherein said transmission gear wheel is moveable into frictional engagement with one of said two gear wheels that rotate in opposite directions.

6. A coupling gear according to claim 4, wherein said control device further comprises a control gear wheel with an eccentric and wherein said control element is supported at said eccentric.

7. A coupling gear according to claim 6, wherein the rotational axis of said control gear wheel is positioned so as to coincide with the rotational axle of one of said first and second coupling wheels and wherein said control element engages one of said rotational axles of said third and fourth coupling wheels.

8. A coupling gear according to claim 6, wherein said helical gearing comprises a drive pinion connected to said control motor and an outer toothing connected to said transmission gear wheel, said drive pinion meshing with said outer toothing of said transmission gear wheel, wherein said control gear wheel is shaped as a segment of a circle and has an outer toothing and wherein said transmission gear wheel comprises a further toothing meshing with said outer toothing of said control gear wheel, wherein a gear ratio between said drive pinion and said outer toothing of said control gear wheel is such that a large rotational angle of said drive pinion results in a small rotational angle of said control gear wheel.

9. A coupling gear according to claim 6, having a self-locking action with respect to accidental adjustment when said control device is not activated.

10. A coupling gear according to claim 9, wherein said self-locking action is realized with said eccentric acting on said control element.

11. A coupling gear according to claim 10, wherein said eccentric is comprised of a pin eccentrically connected to said control gear wheel and a bearing sleeve supported on said pin, said control element connected to said bearing sleeve, wherein a diameter of said bearing sleeve is greater than a distance between an axis of said bearing sleeve and the rotational axle of said control gear wheel.

12. A coupling gear according to claim 10, wherein in one end position of said eccentric said rotational phase assumes an extreme value.

13. A coupling gear according to claim 1, wherein said friction member is elastically biased into a neutral position.

14. A coupling gear according to claim 1, wherein said friction member is mounted on one of said couplers.

15. A coupling gear according to claim 1, further comprising a device for resetting the rotational phase to a preset value when an operating error occurs.

16. A coupling gear according to claim 1, wherein:
said control device comprises a drive unit with a drive gear wheel rotatable in opposite directions;
said control device further comprises a control member with an outer toothing, said drive gear wheel meshing with said control member;
said drive unit is positioned eccentrically to the rotational axis of said drive gear wheel and has a pivot axis about which said drive unit is pivotable;
said friction member is a friction wheel;
said drive unit, when said drive gear wheel is being driven, is pivoted due to a reaction force resulting at said control member about said pivot axis such that said friction wheel is brought into frictional engagement with one of two of said coupling wheels rotating in opposite directions for aiding rotation of said drive gear wheel.

17. A coupling gear according to claim 16, wherein said pivot axis is arranged symmetrically to the rotational axes of said two coupling wheels rotating in opposite directions.

18. A coupling gear according to claim 16, wherein said control member is a control gear wheel having a rotational axis positioned so as to coincide with said pivot axis.

19. A coupling gear according to claim 16, wherein said friction wheel has a friction surface and wherein said coupling wheels have a friction surface for providing said frictional engagement, wherein said friction surfaces of said friction wheel and of said coupling wheels have a plurality of wedge projections.

20. A coupling gear according to claim 16, wherein said drive gear wheel is positioned such that a rotational axis of said drive gear wheel and a rotational axis of said friction wheel coincide, wherein said drive gear wheel is fixedly connected to said friction wheel, wherein said friction wheel has an outer circumferential surface that is a friction surface.

21. A coupling gear according to claim 20, wherein:
said drive unit comprises an electric motor with a drive pinion;
said friction wheel has an inner toothing and planetary gear wheels meshing with said inner toothing; and
said drive pinion drive said planetary gear wheels.

22. A coupling gear according to claim 20, wherein said drive unit comprises an electric motor comprising a worm gear, wherein said drive gear wheel is driven by said worm gear.

* * * * *